(12) United States Patent
Tiwari et al.

(10) Patent No.: US 9,411,326 B2
(45) Date of Patent: Aug. 9, 2016

(54) PLANT CONTROL OPTIMIZATION SYSTEM INCLUDING VISUAL RISK DISPLAY

(75) Inventors: Awadesh Kumar Tiwari, Bangalore (IN); Christopher Eugene Long, Greensville, SC (US); Mahesh Kumar Asati, Bangalore (IN); Scott Mordin Hoyte, Greensville, SC (US); Achalesh Kumar Pandey, Greensville, SC (US); Vikas Handa, Bangalore (IN)

(73) Assignee: General Electric Company, Schenectady, NY (US)

( * ) Notice: Subject to any disclaimer, the term of this patent is extended or adjusted under 35 U.S.C. 154(b) by 523 days.

(21) Appl. No.: 13/591,195

(22) Filed: Aug. 21, 2012

(65) Prior Publication Data

US 2014/0058534 A1     Feb. 27, 2014

(51) Int. Cl.
G05B 19/18     (2006.01)
G05B 13/04     (2006.01)

(52) U.S. Cl.
CPC ............... *G05B 13/04* (2013.01); *Y02P 90/14* (2015.11); *Y02P 90/20* (2015.11)

(58) Field of Classification Search
None
See application file for complete search history.

(56) References Cited

U.S. PATENT DOCUMENTS

| | | | |
|---|---|---|---|
| 4,269,030 A | 5/1981 | Osborne | |
| 5,347,466 A | 9/1994 | Nichols et al. | |
| 7,280,877 B2 | 10/2007 | Shioya et al. | |
| 7,797,062 B2* | 9/2010 | Discenzo et al. | 700/28 |
| 2001/0056315 A1 | 12/2001 | Nagafuchi et al. | |
| 2003/0100974 A1 | 5/2003 | Alvarez et al. | |
| 2004/0123600 A1 | 7/2004 | Brunell et al. | |
| 2006/0178782 A1 | 8/2006 | Pechtl et al. | |
| 2007/0271898 A1 | 11/2007 | Little | |
| 2009/0012653 A1 | 1/2009 | Cheng et al. | |
| 2009/0150040 A1 | 6/2009 | Rofka et al. | |
| 2010/0031667 A1 | 2/2010 | Hoffmann et al. | |
| 2010/0306001 A1* | 12/2010 | Discenzo | G05B 13/024 705/7.37 |
| 2011/0054965 A1 | 3/2011 | Katagiri et al. | |
| 2011/0066298 A1* | 3/2011 | Francino et al. | 700/290 |
| 2011/0245937 A1* | 10/2011 | Rawson et al. | 700/90 |
| 2012/0130688 A1* | 5/2012 | Jiang | F01D 21/003 703/2 |
| 2013/0238256 A1* | 9/2013 | Anup | G05B 23/0283 702/34 |

FOREIGN PATENT DOCUMENTS

| | | |
|---|---|---|
| JP | 5145966 A | 6/1993 |
| JP | 10061412 A | 3/1998 |
| JP | 10187211 A | 7/1998 |

(Continued)

OTHER PUBLICATIONS

IBM Personal Computer Brochure, International Business Machines Corporation, 1982, whole document.*

(Continued)

*Primary Examiner* — Mohammad Ali
*Assistant Examiner* — Bernard G Lindsay
(74) *Attorney, Agent, or Firm* — Fletcher Yoder, P.C.

(57) ABSTRACT

Systems and methods provided herein output an operational advisory based upon a plurality of models derived from a plurality of data, in which the plurality of models comprise at least one of a plant transfer function, a degradation contributor model, or a plant level cost model, and in which the plurality of data is derived from at least one of current plant data, historical plant data, business data, environmental data, component data, degradation contribution data, an optimization goal, or a combination thereof.

19 Claims, 5 Drawing Sheets

(56) References Cited

FOREIGN PATENT DOCUMENTS

| JP | 11182263 A | 7/1999 |
| JP | 2007133571 A | 5/2007 |
| JP | 2011118739 A | 6/2011 |
| KR | 100941558 B1 | 2/2010 |
| KR | 101087739 B1 | 11/2011 |
| WO | 2011080548 A1 | 7/2011 |

OTHER PUBLICATIONS

International Search Report and Written Opinion issued in connection with corresponding PCT Application No. PCT/US2013/051439 dated Apr. 25, 2014.

EP Extended Search Report; Application No. EP13783128.5; Dated Jun. 1, 2016; 7 pages.

* cited by examiner

PLANT CONTROL OPTIMIZATION SYSTEM INCLUDING VISUAL RISK DISPLAY

BACKGROUND OF THE INVENTION

The present disclosure relates to operations of an industrial plant, and more particularly to systems and methods for optimizing the operations of the industrial plant.

An industrial plant, such as a power generation plant, includes a plurality of interrelated equipment and processes. For example, power generation plants may include turbine systems and processes for operating and maintaining the turbine systems. During plant operations, the equipment and processes may age or otherwise undergo change, potentially affecting overall plant effectiveness. It would be beneficial to address such issues in a more optimized way.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes an advisory system configured to output an operational advisory based upon a plurality of models derived from a plurality of data, in which the plurality of models comprise at least one of a plant transfer function, a degradation contributor model, or a plant level cost model, and in which the plurality of data is derived from at least one of current plant data, historical plant data, business data, environmental data, component data, degradation contribution data, an optimization goal, or a combination thereof.

In a second embodiment, a method includes determining an operational advisory in a plant, in which the operational advisory is determined based upon a plant transfer function, a degradation contributor model, a plant level cost function, or a combination thereof and one or more optimization objectives. The method also includes outputting the operational advisory, in which the operational advisory comprises at least one of a maintenance schedule, an alert, message control action, or a combination thereof.

In a third embodiment, a system includes non-transitory, computer-readable medium comprising code configured to determine an operational advisory in a plant, in which the operational advisory is determined based upon a plant transfer function, a degradation contributor model, a plant level cost function, or a combination thereof and one or more optimization objectives, and to output the operational advisory, in which the operational advisory comprises at least one of a maintenance schedule, an alert, message control action, or a combination thereof.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
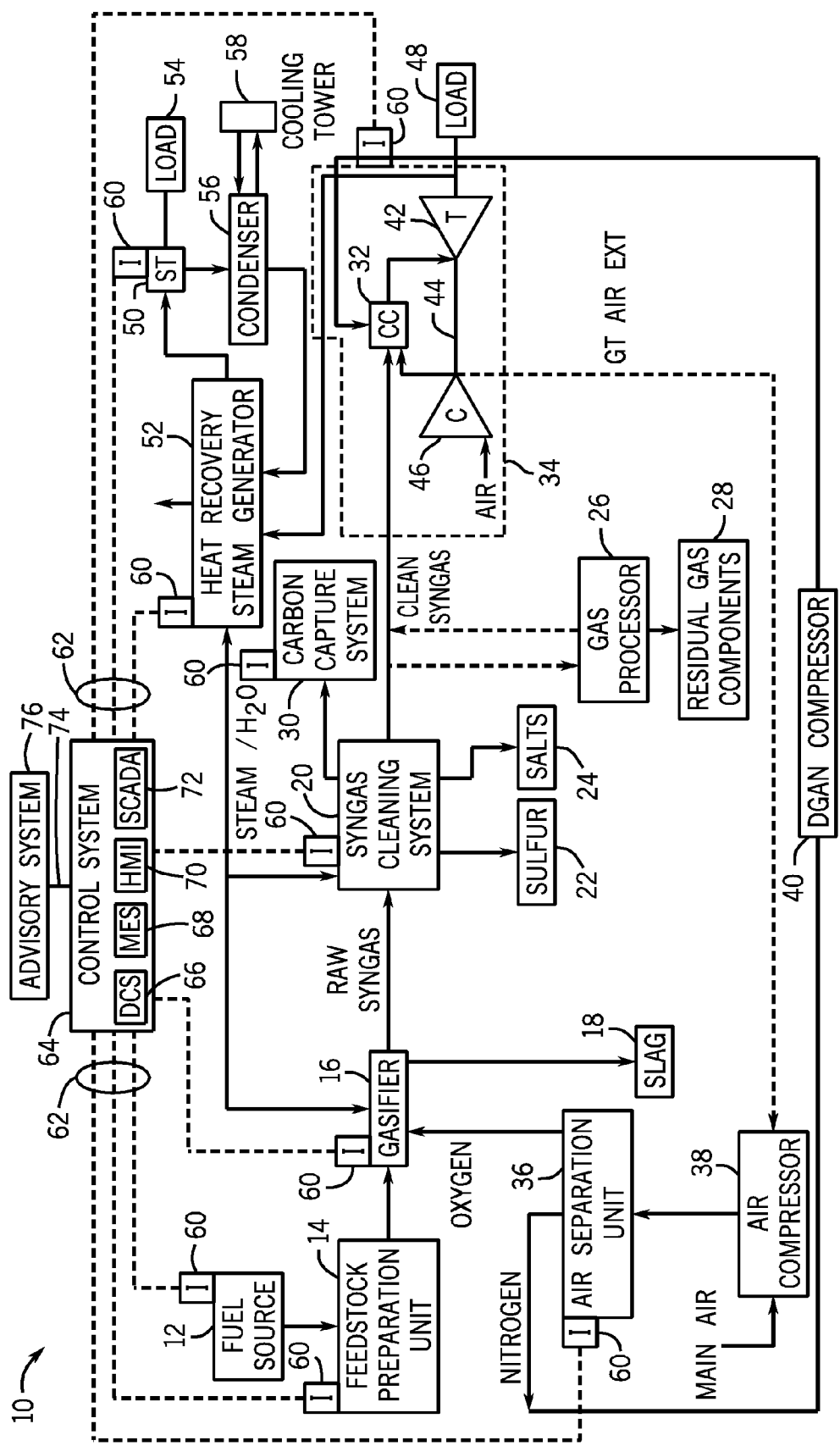
FIG. 1 illustrates an embodiment of a power plant having an advisory system, in accordance with aspects of the present disclosure.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure may apply to a variety of industrial plants, including but not limited to power plants, chemical plants, manufacturing plants, oil refineries, and the like. Industrial plants may include a variety of equipment and processes useful in providing a variety of operations and services. For example, power plant equipment or machinery may provide operations suitable for producing power. Likewise, chemical processing machinery may provide operations useful in the manufacturing and/or processing of chemicals. Similarly, manufacturing machinery may provide operations suitable for making or otherwise reshaping physical items.

Industrial plants, such as power plants, may include many different components and processes. For example, the plants may include turbine systems, electrical generators, gas treatment systems (e.g., acid gas removal systems), boilers, furnaces, gasifiers, and so forth. As previously mentioned, performance parameters and physical parameters of such components and processes may change over time due to aging, environmental factors, etc. As such, the individual components as well as the plant may be subject to degradation, which may potentially affect plant performance.

As a result, it may be beneficial to update new control parameters of such components in order to compensate for the degradation. The present disclosure provides an industrial plant capable of determining control parameters based on a plurality of data types, such as current plant data, historical plant data, technical and commercial data, environmental data, degradation data, optimization criteria, and so forth. Commercial data, for example, may be used to calculate plant parameters related to current quantity of desired power production based on market conditions. Further, federal regulations, code, and/or standards (e.g., industry standards) may be used to derive operational parameters such as emission levels, testing intervals, reporting methods, and so forth. Current plant data generally refers to data generated by the plant during plant operations that are subject to change over time. For example, data generated through the use of plant instrumentation such as sensor instrumentation may be current plant data. Historic plant data generally refers to stable data, including data determined during plant construction, plant configuration data, or records of past plant behavior and/or trends.

By using the systems and methods described herein, the abovementioned data may be combined and manipulated to build a plurality of models, which may be used to derive information useful in optimizing plant operations. In one embodiment, an advisory system coupled to the industrial plant may be configured to form component level as well as plant level models, such as transfer functions, degradation contribution models, and cost models from the abovementioned data. The advisory system may then make control decisions according to such models and predetermined logic. The advisory system may also be configured to automatically implement an automated control command corresponding to such a control decision. Additionally, the advisory system may be configured to output control recommendations to an operator through a human-machine interface. Control recommendations may include instructions to perform a certain command or maintenance task. The advisory system may also output an optimal maintenance schedule outlining strategic times to perform plant maintenance based on optimization criteria. Generally, the techniques described herein may be used to derive actions suitable for improving the use of plant equipment and increasing plant reliability and efficiency.

Turning now to the figures, FIG. 1 is a block diagram of an exemplary power plant 10 configured to provide operational control and advisory actions. As illustrated, the power plant 10 is powered by a fuel source 12, such as a solid feed, which is used to generate a syngas. The fuel source 12 may include coal, petroleum coke, biomass, wood-based materials, agricultural wastes, tars, coke oven gas and asphalt, or other carbon containing items. The solid fuel of the fuel source 12 may be passed to a feedstock preparation unit 14. The feedstock preparation unit 14 may, for example, resize or reshape the fuel source 12 by chopping, crushing, milling, shredding, pulverizing, briquetting, or palletizing the fuel source 12 to generate feedstock. Additionally, water, or other suitable liquids, may be added to the fuel source 12 in the feedstock preparation unit 14 to create slurry feedstock. In other embodiments, no liquid is added to the fuel source 12, thus yielding dry feedstock.

The feedstock may be passed to a gasifier 16 from the feedstock preparation unit 14. The gasifier 16 may convert the feedstock into a combination of carbon monoxide, carbon dioxide, water, and hydrogen, e.g., syngas. This conversion may be accomplished by subjecting the feedstock to a controlled amount of steam and oxygen at elevated pressures. The gasification process may include the feedstock undergoing a pyrolysis process, whereby the feedstock is heated, generating a solid, e.g., char, and residue gases, e.g., carbon monoxide, and hydrogen.

A combustion process may then occur in the gasifier 16. The combustion may include introducing oxygen to the char and residue gases. The char and residue gases may react with the oxygen to form carbon dioxide and carbon monoxide, which provides heat for the subsequent gasification reactions. Next, steam may be introduced into the gasifier 16 during a gasification step. The char may react with the carbon dioxide and steam to produce carbon monoxide and hydrogen at temperatures ranging from approximately 800° C. to 1100° C. In essence, the gasifier 16 utilizes steam and oxygen to allow some of the feedstock to be "burned" to produce carbon monoxide and energy, which drives a second reaction that converts further feedstock to hydrogen and additional carbon dioxide. In this way, a resultant gas is manufactured by the gasifier 16. This resultant gas may be termed raw syngas. The gasifier 16 may also generate waste, such as slag 18, which may be a wet ash material. This slag 18 may be removed from the gasifier 16 and disposed of, for example, as road base or as another building material.

The raw syngas from the gasifier 16 may then be cleaned in a gas treatment system 20. For example, the gas treatment system 20 may perform separate sulfur 22 and salts 24 from the cooled raw (e.g., non-scrubbed) syngas. Subsequently, the gas from the gas treatment system 20 may include clean (e.g., scrubbed) syngas. In certain embodiments, a gas processor 26 may be utilized to remove residual gas components 28 from the clean (e.g., scrubbed) syngas such as, ammonia, methanol, or any residual chemicals. In addition, in certain embodiments, a carbon capture system 30 may remove and process the carbonaceous gas (e.g., carbon dioxide that is approximately 80-100 percent pure by volume) contained in the syngas. The scrubbed syngas may be then transmitted to a combustor 32, e.g., a combustion chamber, of a gas turbine engine 34 as combustible fuel.

The power plant 10 may further include an air separation unit (ASU) 36. The ASU 36 may operate to separate air into component gases by, for example, distillation techniques. The ASU 36 may separate oxygen from the air supplied to it from an ASU compressor 38, and the ASU 36 may transfer the separated oxygen to the gasifier 16. Additionally, the ASU 36 may transmit separated nitrogen to a diluent gaseous nitrogen (DGAN) compressor 40.

The DGAN compressor 40 may compress the nitrogen received from the ASU 36 at least to pressure levels equal to those in the combustor 32 of the gas turbine engine 34, for proper injection to happen into the combustor chamber. Thus, once the DGAN compressor 40 has adequately compressed the nitrogen to a proper level, the DGAN compressor 40 may transmit the compressed nitrogen to the combustor 32 of the gas turbine engine 34. The nitrogen may be used as a diluent to facilitate control of emissions, for example.

The gas turbine engine 34 may include a turbine 42, a drive shaft 44 and a compressor 46, as well as the combustor 32. The combustor 32 may receive fuel, such as syngas, which may be injected under pressure from fuel nozzles. This fuel may be mixed with compressed air as well as compressed nitrogen from the DGAN compressor 40, and combusted within combustor 32. This combustion may create hot pressurized combustion gases. The combustor 32 may direct the combustion gases towards an inlet of the turbine 42. As the combustion gases from the combustor 32 pass through the turbine 42, the combustion gases may force turbine blades in the turbine 42 to rotate the drive shaft 44 along an axis of the gas turbine engine 34. As illustrated, drive shaft 44 is connected to various components of the gas turbine engine 34, including the compressor 46. The drive shaft 44 may connect the turbine 42 to the compressor 46 to form a rotor. The compressor 46 may include blades coupled to the drive shaft 44. Thus, rotation of turbine blades in the turbine 42 causes the drive shaft 44 connecting the turbine 42 to the compressor 46 to rotate blades within the compressor 46. This rotation of blades in the compressor 46 may cause the compressor 46 to compress air received via an air intake in the compressor 46.

The compressed air may then be fed to the combustor 32 and mixed with fuel and compressed nitrogen to allow for higher efficiency combustion. The drive shaft 44 may also be connected to a first load 48, which may be a stationary load, such as an electrical generator for producing electrical power, for example, in a power plant. Indeed, the first load 48 may be any suitable device that is powered by the rotational output of the gas turbine engine 34.

The power plant 10 also may include a steam turbine engine 50 and a heat recovery steam generation (HRSG) system 52. The steam turbine engine 50 may drive a second load 54. The second load 54 may also be an electrical generator for generating electrical power. However, both the first and second loads 48, 54 may be other types of loads capable of being driven by the gas turbine engine 34 and steam turbine engine 50, respectively.

Additionally, heated exhaust gas from the gas turbine engine 34 may be transported into the HRSG 52 and used to heat water and produce steam used to power the steam turbine engine 50. Exhaust from, for example, a low-pressure section of the steam turbine engine 50 may be directed into a condenser 56. The condenser 56 may utilize a cooling tower 58 to exchange heated water for cooled water. The cooling tower 58 acts to provide cool water to the condenser 56 to aid in condensing the steam transmitted to the condenser 56 from the steam turbine engine 50. Condensate from the condenser 56 may, in turn, be directed into the HRSG 52. Again, exhaust from the gas turbine engine 34 may also be directed into the HRSG 52 to heat the water from the condenser 56 and produce steam.

The illustrated industrial plant 10 of FIG. 1 includes a variety of different subsystems and components that perform different tasks, such as the fuel source 12, the gasifier 16, the gas treatment system 20, the carbon capture system 30, the heat recovery steam generator 52, the steam turbine engine 50, and so forth. These components may be coupled to a plurality of instrumentation 60 (e.g., sensors, controllers, activators, etc.) that transmit data regarding conditions, attributes, and actions of the respective components. The instrumentation 60 may be configured to monitor a plurality of parameters related to the operation and performance of the components. For example, one of the plurality of instrumentation 60 may be coupled to the gas turbine engine 34. The instrumentation 60 may measure, for example, environmental conditions, such as ambient temperature and ambient pressure, as well as a plurality of engine parameters related to the operation and performance of the gas turbine engine 34, such as exhaust gas temperature, rotor speed, engine temperature, engine pressure, gas temperature, engine fuel flow, vibration, clearance between rotating and stationary components, compressor discharge pressure, exhaust emissions/pollutants, and turbine exhaust pressure. Further, the instrumentation 60 may also measure actuator information such as valve position, and a geometry position of variable geometry components (e.g., air inlet). The instrumentation 60 may also act as a controller, controlling certain aspects of the respective component according to received control signals. Measurements taken by the instrumentation 60 may be transmitted via a control network 62 and received by a plant control system 64. Likewise, data, such as control signals, from the plant control system 64 may be transmitted to the instrumentation 60.

The plant control system 64 may be a control station or computer which includes a distributed control system (DCS) 66, a manufacturing execution system (MES 68), a human machine interface (HMI) system 70, and/or a supervisor control and data acquisition (SCADA) system 72. The plant control system 64 may also employ several types of control systems, include a multivariable control system, an H infinite control system, an H2 control system, a linear quadratic regulator, a linear quadratic Gaussian control system, and so forth. The HMI system 70 may include a display and interface system, which may enable an operator to interact with the plant control system 64 and other plant components. For example, the display and interface system may include screens suitable for entering information and displaying a variety of data. In certain embodiments, the display and interface system may enable remote access to the various components of the plant 10, such as intranet, and internet or web access.

Additionally, the control system 64 may be coupled to an advisory system 76. The advisory system 76 may receive data from the control system 64 to perform certain calculations to produce control or maintenance related advisories. The advisory system 76 may provide recommended control actions, optimal maintenance schedules based on a plurality of data, including current plant data, historic plant data, environmental factors and forecasts, market factors and forecasts, and so forth. Such data and the manipulating of such data to obtain the advisories will be discussed in further detail below. The advisory system 76 may output recommended manual control actions to operators and/or automatically implement control parameters by sending a signal to the control system 64, which may then send appropriate control signals to the instrumentation 60. The manual control actions may be communicated to the operator, for example, through alerts, alarms, and messages. This communication may include textual information and multimedia (e.g., images, videos, 3D views, audio) descriptive of the recommended control action. The advisory system 66 may be implemented as a single computing device at the plant site or remotely, or the advisory system 66 may be a plurality of computing devices accessible from different locations.

Figure 2:
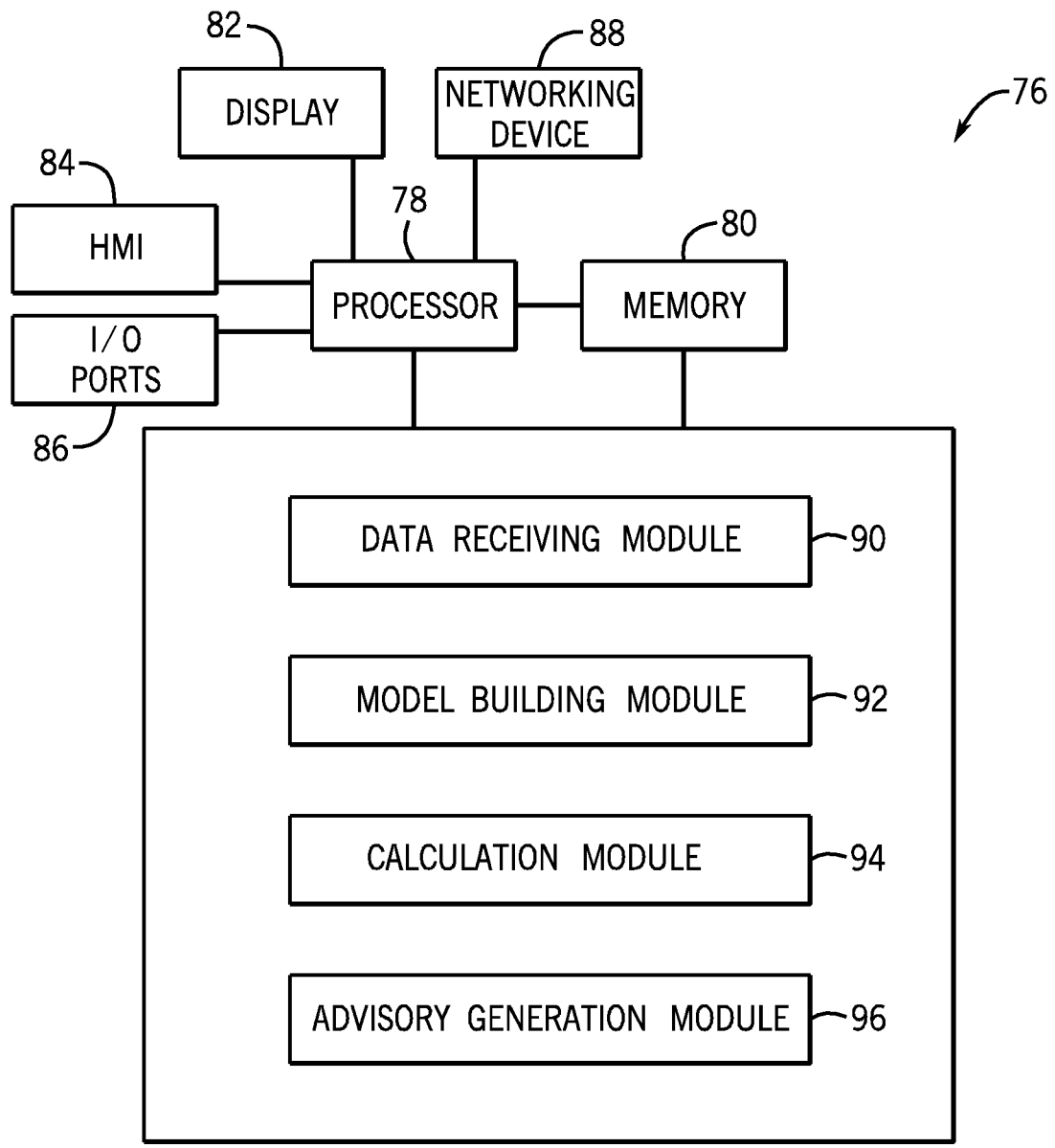
FIG. 2 is a schematic diagram of an embodiment of the advisory system of FIG. 1, in accordance with aspects of the present disclosure.

FIG. 2 is a schematic representation of an embodiment of the advisory system 76. The advisory system 76 may include a processor 78, a memory 80, a display 82, the human-machine interface 70, one or more I/O ports 86, and a networking device 88. The processor 78 may be configured to execute non-transient machine readable code (e.g., computer instructions) to carry out calculations, decisions, data processing, and communications associated with operation of the advisory system 76. Such code may be included in the memory 80. The memory 80 may include volatile memory, non-volatile memory, random access memory (RAM), read only memory (ROM), and so forth. The memory 80 may also store a plurality of data, including historic plant data, business and environmental data, physics data, and so forth. The advisory system 76 may further include several modules, including a data receiving module 90, a model building module 92, a calculation module 94, and an advisory generation module 96.

The data receiving module 90 may receive current plant data from the instrumentation 60 as well as any stored data from the memory, such as historic plant data and technical and commercial data, environmental data, degradation data, optimization criteria, and so forth. In certain embodiments, the data receiving module 90 may be configured to download certain data, such as commercial data (e.g., energy market data, energy futures data, fuel market data, fuel futures data), environmental data (e.g., "green" credits data, cap emissions data), regulatory data (e.g., allowed emissions data) degradation data, and optimization criteria, from a network or database. Such data may be subject to frequent updates.

As previously mentioned, the advisory system 76 may use several types of data to generate optimal control advisories. The current plant data, which may be received from the instrumentation 60, may include measurements and derivations based on the instrumentation 60. For example, the data may include temperature measurements, pressure measurements, flow measurements, clearance measurements (e.g., measuring distances between a rotating component and a stationary component), vibration measurements, position measurements, chemical measurements, power production measurements, exhaust emissions measurements, stress or strain measurements, leakage measurements, speed measurements, fuel utilization measurements, and so forth. The plant equipment data may include data related to individual equipment. For example, the data may include operating conditions of the equipment (e.g., speed, temperature, pressure, vibration, flow, fuel consumption, power production, clearance), maintenance history (e.g., maintenance logs), performance history (e.g., power production logs), and the like.

The business or market data may include data associated with economic and business conditions that may impact the plant 10. For example, the data may include market data for the demand and supply of electrical power, manufactured goods, fuel, raw materials (e.g., metals, chemicals), and/or processed materials (e.g., processed chemicals, refined oil). Further, the data may include data related to futures market, e.g., sales of future power output, future commodities, future raw material, and the like. Additionally, the data may include supply and demand data in regulatory markets, such as cap and trade markets (i.e., emissions markets). Further, the data may include business data related to tax credits for emission controls, tax credits for the use of certain technologies (e.g., carbon capture technologies, carbon sequestration technologies), regulatory costs related to the emissions of certain chemicals (e.g., sulfur emissions, $CO_2$ emissions), and so forth. Environmental data may include data such as weather prediction information, which also impact maintenance scheduling and the like.

The advisory system 76 may also employ physics related data which take into account failure mode analysis and risk data, operational models, and physical properties and algorithms. Failure mode analysis and risk data may include data useful in deriving certain risks associated with plant operations. For example, the failure mode analysis and risk data may include physics-based models, such as such as low cycle fatigue (LCF) life prediction models, computational fluid dynamics (CFD) models, finite element analysis (FEA) models, solid models (e.g., parametric and non-parametric modeling), and/or 3-dimension to 2-dimension FEA mapping models that may be used to predict the risk of equipment malfunction or the need for equipment maintenance. In conjunction with the failure mode analysis, the operational modes and physical properties may be used to simulate the operation of the power plant 10 and power plant 10 components. Accordingly, power output, fuel utilization, syngas production, HRGS 52 energy recovery, turbine 34 engine speed, and so on, may be simulated.

The failure mode analysis and risk data, and operational models may also include statistical models, such as regression analysis models, data mining models (e.g., clustering models, classification models, association models), and the like. For example, clustering techniques may discover groups or structures in the data that are in some way "similar." Classification techniques may classify data points as members of certain groups, for example, components having a higher probability of encountering an unplanned maintenance event. Regression analysis may be used to find functions capable of modeling future trends within a certain error range. Association techniques may be used to find relationship between variables. For example, using associative rule learning techniques may lead to associating certain cold start procedures with increased blade wear in a turbine system.

It should be noted that the data types described above are examples of data that may be used by the advisory system 76 in determining optimal control actions and schedules. Embodiments of the advisory system 76 may utilize only a subset of the mentioned data types or include other data that were described herein.

The model building module 92 may be configured to use data received by the data receiving module 90 to build desired models. The models may include a plant transfer function, a component lever transfer function, a plant level cost model, a degradation contribution model, an optimization model, or other related models. The plant degradation contribution model generally models how degradation of a certain component affects the overall plant, generally in terms of efficiency for other performance criteria. The plant level cost model is generally built as a function of the degradation contribution model and other critical data, such as cost, power, heat rate, emission, demand, supply, and so forth. The optimization model may be built from the optimization criteria as well as the plant level cost model. Such models will be further discussed in FIG. 3.

In one embodiment, the calculation module 94 uses the abovementioned models, inputs, and at least a subset of the abovementioned data to determine an optimal control parameter. If the plant is already in an acceptable state, the calculation module may return a value indicative of such. Otherwise, the calculation module 94 may return an output corresponding to a difference between a current control parameter and an optimal control parameter. The advisory generation module 96 may be configured to translate the output from the calculation model 94 into an operational command that may be performed by the operator or implemented automatically. As such, the advisory generation module 96 may output an advisory to the operator via a display. The advisory generation module 96 may also produce an optimal operational and/or maintenance schedule, which is provided to the operator. For example, a maintenance schedule may include actions such as inspecting plant equipment, replacing certain components, performing equipment tests, and so forth. Likewise, an operational schedule may include time-based actions useful in, for example, starting up plant operations and/or equipment. For example, a turbine startup may include a schedule of operational actions based on delivering fuel, igniting the fuel, and controlling the delivery of fuel and air so as to reach a certain turbine speed. The outputs of the advisory generation module 96 may be presented to the operator on the display 82. The operator may then implement certain recommended control actions via the HMI 70. The outputs may also be transmitted to other control stations or devices via the networking device 88, which may include a wireless router, a modem, an Ethernet card, a gateway, or the like. The outputs may also be communicated via the communication channel 74.

Figure 3:
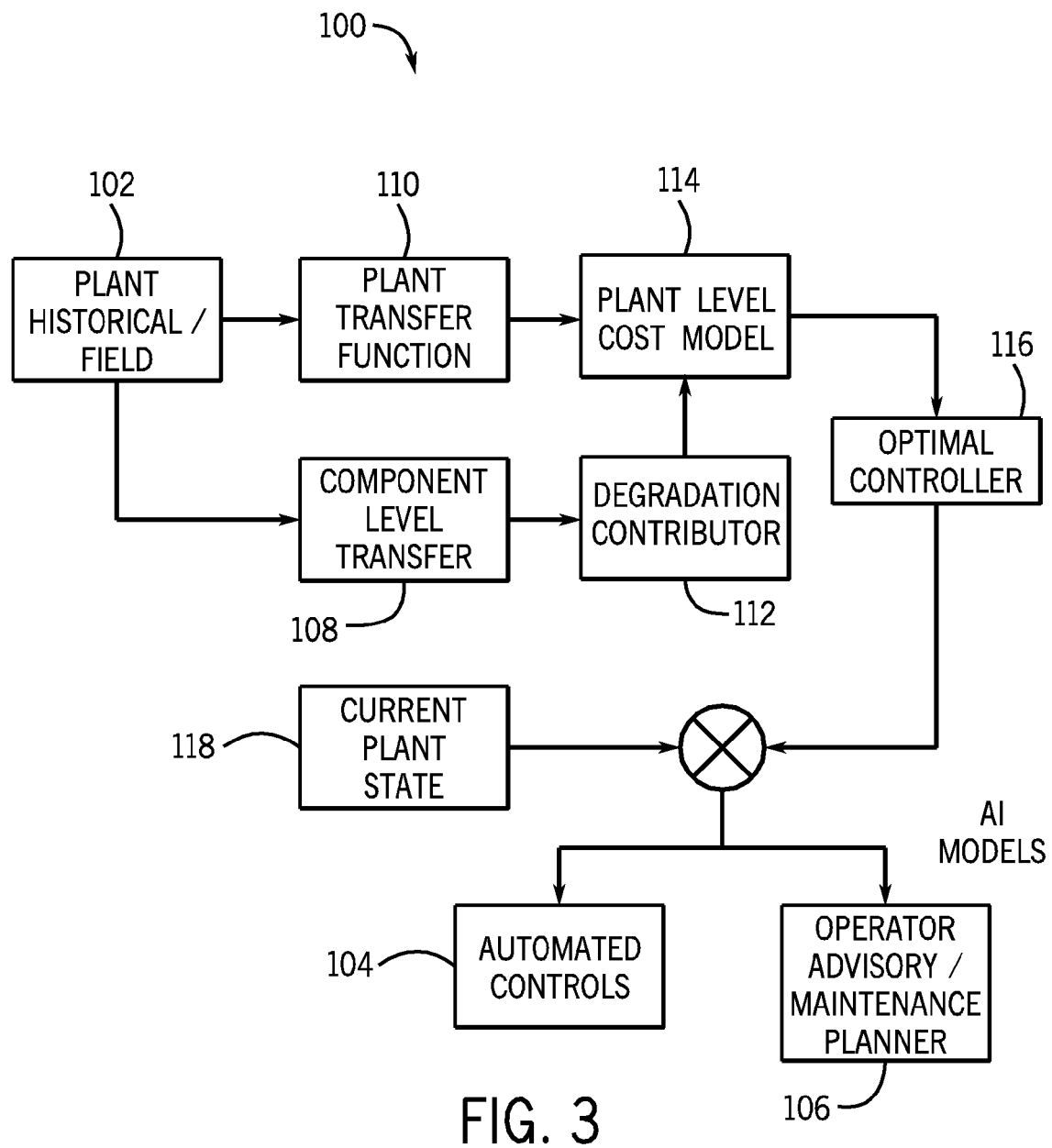
FIG. 3 is a block diagram illustrating an embodiment of a system useful in optimizing the power plant of FIG. 1, in accordance with aspects of the present disclosure.

FIG. 3 is a block diagram representation of an embodiment of the advisory system 76, by which data 102 may be used to produce automated control actions 104 and operator advisories 106. The data, as discussed, may include current plant data, historical plant data, physics data, business and market data, environmental data, and so forth. Based on such inputs, a component level transfer function 108 as well as a plant level transfer function 110 may be determined. Specifically, the component level transfer function generally models the relationship between the input and output, or system response of a particular component. As such, an output of the particular component may be determined from an input, given the component level transfer function. In certain embodiments, a plurality of component level transfer functions may model the input-output relationship of a respective plurality of components, such as a gas turbine, steam turbine, heat recovery steam generator, and so forth, thus simulating the respective components and/or component interactions. The plant level transfer function may likewise model the input-output relationship of the entire industrial plant 10 or a subset of components. Accordingly, a full plant 10 simulation may be enabled, suitable for simulating power plant 10 power production, fuel use, emissions, maintenance schedules, and the like.

The component level transfer function 108 may then be used to determine a degradation contributor model 112. Degradation refers to the difference between the rated (e.g., International Organization for Standardization (ISO) rating, ISO 3977 rating, manufacturer rating) value of a parameter of a component (e.g., temperature, flow rate, emission, pressure, etc.) and the currently observed value of the respective parameter. The degradation contributor model 112 may include conventional degradation contributions, such as condenser performance degradation, turbine performance degradation, and more generally, models related to degradation of subsystems and/or components of the system 10. Advantageously, non-conventional contributions for deriving degradation may also be used. For example, current response time of drum levels to commanded set-points, response times of valves (e.g., bypass valves) opening and closing, and so forth. In other words, the non-conventional contributors include direct or indirect observations of behavior of related systems and components. By using a hybrid approach of combining conventional degradation contributions with non-conventional degradation contributions, a more accurate degradation contributor model 112 may be provided.

The degradation of each parameter of each component may have a unique effect of the performance of the overall plant. Accordingly, processes to track changes in performance due to degradation may also be provided. Examples include: accumulated rate of change of fluid pumping that would directly impact flow and hence megawatt performance. Similarly, ageing response of drums to level set-points may be a direct indicator of HRSG 52 performance/efficiency degradation. Also higher variations in firing temperature may mean increased exhaust losses and thus performance degradation. Generally, the degradation contributor model 112 may be expressed as a parametric model in which the coefficients reflect the weight or importance of the degradation of a specific parameter or component on the overall plant. The coefficients may be found through regression modeling of history plant data or another method. As such, the degradation contributor model 112 reflects degradation in components (e.g., gas turbine, steam turbine, heat recovery steam generator, gasifier, generator, cooling tower), as well as how degradation in certain components contribute to overall plant performance.

A plant level cost model 114 may be built as a function of the degradation contributor 112, the plant level transfer function 110, and critical parameters such as cost, power, heat rate, emission, demand, supply, and so forth. The generation of the plant level cost model 114 may include generating one or more cost functions of degradation contributors that can be used to solve multi-objective constrained/unconstrained dynamical optimization problems for plant level performance improvement. Some decision variables for degradation contributors include response time of drum level to commanded set-points, valve (e.g. bypass valve) opening/closing response time, change in rate of cooling with respect to time, feed-water flow change with time, rate of condensate formation, change in pumping rate, and so on, in addition to other contributors mentioned herein. A cost function is an empirical formulation that relates to conventional as well non-conventional degradation contributors.

In one embodiment, the plant level cost model may generally determine what it costs the plant to achieve a desired output, such as the amount of power produced. The plant level cost model is generally a function of certain desired outputs (e.g., power generated), operating parameters for achieving the desired output (e.g., equipment pressure, heat rate, temperature, flow rate, operating speed, emissions, cost and amount of fuel), and the degradation contributor model 112. The cost may be determined as a weighted aggregate of these cost factors. An empirical relation with weight derivates may be used to establish closed form "cost function" of degradation contributors that involve utilizing knowledge of physics, statistics, and heuristics as well. Parametric coefficients are adaptive to part load, base load and peak load operations. For example, fouling inside boiler could be caused due to foreign body formed because of ageing heat exchanger, other form of impurities. Application of data mining techniques, including machine learning, neural networks (NN), artificial intelligence, artificial NN, and so on, to develop plant level transfer functions 110 relating degradation and its contributors. One approach would include conducting design experiments and building response surface models to generate the transfer functions 110. As such, the plant level cost model may be able to determine the cost (e.g., maintenance costs, fuel costs, risks, operational costs) of producing the desired output. Indeed, the plant 10 cost function may include a degradation contribution as input, where the degradation contribution takes into account degradation due to all components or systems included in the plant 10 (e.g., HRSG 52, gas turbine engine 34, steam turbine 50, exhaust pressure loss, condenser 56, control valves, and so on). By incorporating real-world degradation contributions, the plant level cost model and associated submodels (e.g., physics-based models, statistical models) may include improved accuracy.

An optimal controller 116 then uses the plant level cost model 114 and an optimization technique to determine optimal parameters. The optimal controller 116 may work as a supervisory system for controlling the steady-state performance of an entire combined cycle power plant (e.g., system 10) in the presence of degradation that uses hybrid models (physics-based & data driven) to enable optimal near-term operation and long-term maintenance planning. The optimal controller 116 may be designed such that the controller 116 prescribes set-points to lower-level regulatory control loops that mitigate the impact of degradation on the system 10. The optimal controller 116 may include various artificial intelligence and optimization techniques to identify and classify optimal parameters for various components of the plant. In one embodiment, the cost function f 114 (e.g., objective function f, utility function f) may be more mathematically optimized by finding $f(x_o) \leq f(x)$ (e.g., minima) for all x in A, where A is the set of constraints for the plant 10. Solvers, including but not limited to linear programming (LP) solvers, second order cone programming (SOCP) solvers, semidefinite programming (SDP) solvers, conic programming solvers, non-linear programming solvers, constraint satisfaction solvers, and/or heuristic solvers, may be used. In another embodiment, the cost function f 114 may be more mathematically optimized using the solvers described herein, by finding $f(x_o) \geq f(x)$ (e.g., maxima) for all x in A.

The optimal controller 116 may solve for optimality of the cost function f 114, as described above. The optimal parameters determined by the optimal controller 116 are then compared with a current plant state 118 to determine the difference between present parameters and optimal parameters, if any. The current plant state may include parameters reflecting the current state of the plant and plant components. The result may be used to determine a recommended control action 104 that may bring the present parameters closer to the optimal parameters as determined by the optimal controller 116. Accordingly, the controller may output optimum firing temperatures, exhaust temperatures, fuel flows, pressures, speed, and so forth.

The advisory system 76 may employ an artificial intelligence (AI) and/or machine learning system to make advisory decisions based upon the output of the optimal controller and other data. The other data may include business/market data, environmental data, regulation data, and so forth. Such data, though not based on physical conditions of the plant, may be worth considering as they may impact control decisions. For example, certain regulations may award credits or benefits to the plant or parent company if the plant emissions are below a certain threshold. However, in order to produce a target power output, the plant may emit greater emissions, and potentially lose the emissions credit. Thus the advisory system, via the AI or machine learning system may calculate the gains and losses of either scenario and make the most advantageous decision. Additionally, the AI or machine learning system may also use historical data to facilitate its decision making. This may include updating or adjusting certain decision thresholds according to past decisions, results, and trends, as well as gaining more refined input-output causal relationships. For example, the advisory system 76 may apply these methods in determining an optimal outage schedule that maximizes returns and minimizes loss.

The AI and/or machine learning systems used to carry out the abovementioned functions may include a k-nearest neighbor system (k-NN) implementing a k-NN algorithm, in which objects or situations are classified based on the closest known example, or nearest neighbor. The AI and/or machine learning system may also include an expert system, in which the expert system emulates the decision making of a human expert. The expert system may include a knowledge database, which may be expressed as a series of "if . . . then . . . " statements and the like. The expert system may also employ an inference engine to facilitate reasoning and decision making. The inference engine may include propositional logic, temporal logic, modal logic, fuzzy logic, and the like. In addition to the discussed KNN algorithm and expert system, the advisory system 76 may also use other AI and/or machine learning systems such as a genetic algorithm, a state vector machine, fuzzy logic, neural networks, and so forth.

Thus, in addition to the optimal controls produced by the optimal controller, which provides control adjustments aimed at maximizing plant performance, the advisory system also incorporates environmental, economic, regulatory, and temporal factors so generate advisories, including updating control parameters, maintenance, and outage planning. The advisories may be implemented automatically as an automated control action, in which the advisory system sends a signal to the control system 64 and the action is automatically implemented. Likewise, the result may be used to generate an operator advisory 106, which may be presented to the operator in the form of an alert, alarm, or message. The operator advisory 106 may include instructions to perform a certain control action. The operator advisory 106 may also include a maintenance planner, which shows the operator the best times to make certain control or maintenance actions, some of which may involve taking the plant or certain components of the plant offline. As discussed, business and environmental data may be used to build such a schedule. For example, the optimization technique may take into consideration expected demand, cost, profitability, weather conditions, as well as the criticality of the maintenance or outage. Additionally, historical plant data may also be used. The optimization techniques may be applied to generate a maintenance schedule using such data as well as user defined optimization objectives and constraints. Additionally, in certain embodiments, the advisory system 76 may provide a button or the like through the HMI 70, with which the operator may push to directly implement the suggested command actions. This allows the operator to implement the commands without navigating to or inputting the commands themselves.

Figure 4:
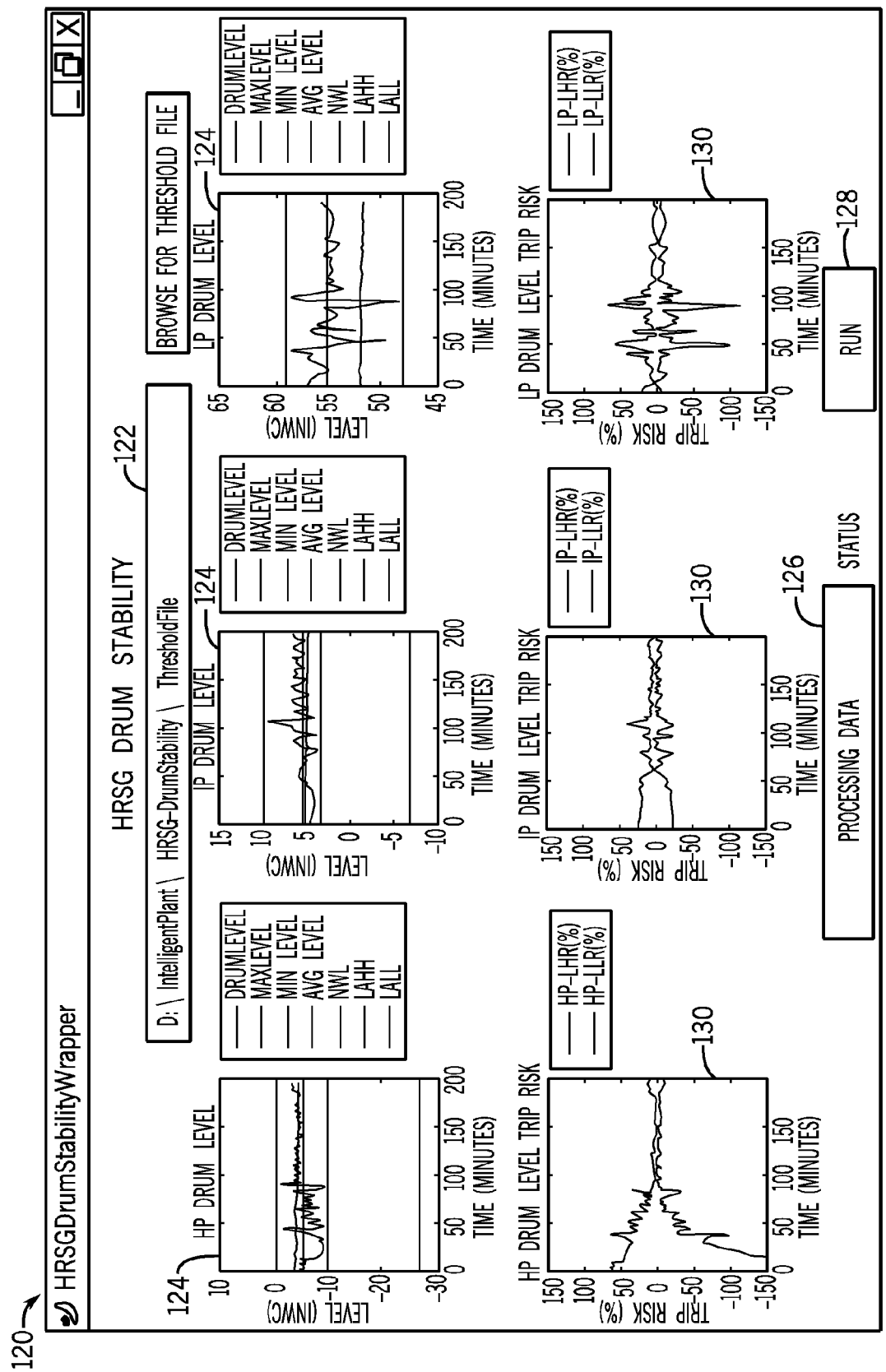
FIG. 4 is an illustration of an embodiment of a graphical user interface of the advisory system of FIG. 1, in accordance with aspects of the present disclosure.

FIG. 4 illustrates an embodiment of an interface 120 (e.g., operator interface) that may be displayed on the HMI 70. The interface 120 may provide recommendations to operation and maintenance teams in the form of visual and very basic, understandable graphics. In addition to stress and current state of the plant displayed by the interface 120, a control panel may provide visual control of plant operations to operators. This innovation may provide classification of plant starts, shutdown, normal operation with respect to magnitude of degradation contributors, predicted/expected behavior pattern of each contributor as operation progresses, and so on. In this particular embodiment, the interface includes a file loader 122, one or more data windows 124, a status bar 126, one or more buttons 128, and one or more calculation windows 130. The file loader 122 allows the operator is load data files into the system. The data files may include sets of historical data, environmental data, market data, optimization objectives, and so forth. As an example, in the illustrated embodiment, a threshold file is uploaded in the file loader 122. The threshold file may contain certain threshold values to be used in generating optimal controls and advisories. The data windows 124 may include a graphical representation of data from the instrumentation 60. In the present embodiment, the data windows illustrate the drum levels of high, intermediate, and low pressure segments of a heat recovery steam generator (HRSG) over time. In other embodiments, the data windows may illustrate component data for any component of the plant 10, such as the turbine engine 34, the steam turbine 50, the condenser 56, and so on. The data window 124 may also indicate threshold levels such that the actual data can be seen relative to the threshold values. The status bar 126 may indicate the current status or activity of the advisory system, such as "ready", "processing", "complete", and the like. The button 128 may be used by the operator to begin, end, or interrupt a process, including a simulation process. The calculation windows 130 may display an outputted result. For example, in the present embodiment, the calculation windows 130 show the calculated trip risk of the HRSG Drum system according to the observed data from the data windows 124 and known correlations and/or algorithms between the observed data, threshold data, other data, and trip risk. The advisory system 76 may further produce an advisory based on the calculated trip risk and other data such as historical data, environmental data, or economic data. By presenting data in the easily visualizable format, the interface 120 may provide a plant 10 operator with visualizations useful in further optimizing the operations for the plant 10.

Figure 5:
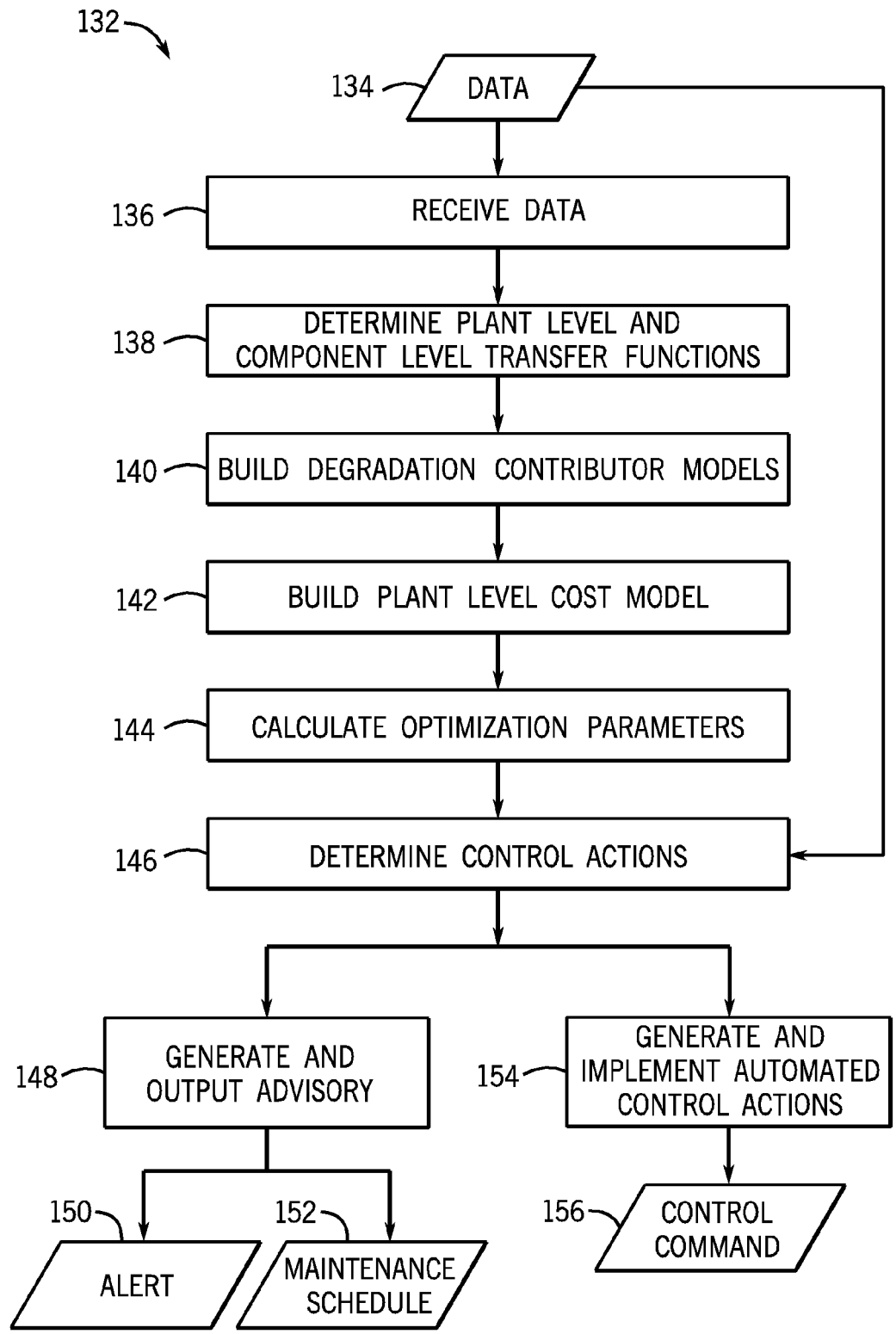
FIG. 5 is a flow chart illustrating an embodiment of a process useful in optimizing the power plant of FIG. 1, in accordance with aspects of the present disclosure.

FIG. 5 illustrates a process 132 employed by the plant 10, and in certain embodiments, by the optimal controller 116 and/or the advisory system 76. The process 132 may be implemented as non-transient machine readable code (e.g., computer instructions) to carry out calculations, decisions, data processing, and communications for the process 132 and executable by the optimal controller 116 and/or the advisory system 76. The process 132 may receive (block 136) data 134 from various sources. The data 134 may include current plant data, which may come from the instrumentation 60 (FIG. 1), historical plant data, business and environmental data, optimization criteria, physics data, and so forth. Some data may be received from the memory 80 and/or be downloaded from a network or database located on another machine. After the appropriate data is received (block 136), the data may be used to determine (block 138) plant level and component level transfer functions. The component level transfer functions along with certain data 134 may be used to build (140) degradation contributor models, which determine the effect or contribution individual components have on the overall performance of the plant. The degradation contributor model and other critical parameters, such as cost, power, heat rate, emission, demand, supple etc., are used to build (block 142) the plant level cost model, which models the performance of the plant as a function of individual components. The plant level cost model may then be used to calculate (block 144) optimization parameters, which are chosen to minimize the effects of component degradation on overall plant performance. Optimization parameters may be related to characteristics such as exhaust temperature, firing temperature, feedwater input, flow levels, etc. The determined optimization parameter values may then be used to determine (block 146) appropriate control actions for realizing the optimization values. This may be done by comparing the optimization values to the current values of the respective parameters. The difference between the optimal values and the current values may be translated into corresponding control actions, which when implemented, may bring current values to the optimal values. The plant 10 or advisory system 76 may then generate and output (block 148) the advisory. The advisory may be outputted to the display of an operator device such as a computer. The advisory may be an alert 150 which provides the operator with suggested control actions and/or instructions for performing such control actions. The advisory may also include a maintenance schedule 152 outlining an optimal timeframe for performing one or a series of control or maintenance actions, such as a plant outage. Indeed, outage and maintenance planning based on trend of degradation contributors compared against standard states as well as design limits may be provided. For example, the techniques described herein may monitor and assess the trends of degradation contributors and compare them against design limits, as well as past experiences and generate the visual information on outage to be taken or next maintenance to be planned. Further, the plant 10 or advisory system may also generate and implement (block 154) automated control actions, which may be control commands 154 that are to be sent to the control system 64 (FIG. 1). Increased and or improved start-up reliability may be achieved. For example, degradation contributor trends may be used as a direct indicator of thermal stresses and other form of loads on system 10 components, thus keeping track of these over plant operations helps in assuring more consistent and more optimized starts and reducing avoidable trips during start-up.

Technical effects of the invention include providing systems and methods that produce optimal control parameters for an industrial plant and plant components. The optical control parameters may then be used to generate control advisories to operators, alerting them of the control actions to perform for optimal plant performance. Additionally, the system may create optimal maintenance schedules that outline the best times for certain maintenance actions or outages, taking in account many factors such as plant/component condition, historic data, business and environmental data, and so forth. The system may also send automated control signals that implement the optimal control actions automatically, without operator interaction. Thus, the system allows plants to be controlled in an optimal manner according the desired optimization considerations.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
a processor configured to:
receive a plurality of data from sensors disposed in a heat recovery steam generation (HRSG) system;
transform the plurality of data into a degradation contributor model via a component level transfer function;
execute an advisory system configured to output an operational advisory based upon the degradation contributor model derived from the plurality of data,
wherein the degradation contributor model is configured to derive a difference between a rated value of the HRSG system and a current value observed via the sensors, and to derive a rate of change of degradation of a specific component of the HRSG system, wherein the rated value comprises at least one of a temperature, a flow rate, a pressure, or a combination thereof;
wherein the plurality of data is derived from at least one of current plant data, historical plant data, business data, environmental data, component data, degradation contribution data, an optimization goal, or a combination thereof,
wherein the processor is configured to derive a level of risk for the occurrence of an undesired equipment event during operations of the specific component of the HRSG system disposed in an industrial plant based on a plurality of models; and
wherein the processor is configured to execute a graphical user interface comprising a visual display displaying a graph on an operator screen having a current level of risk for operating the specific component, and wherein the processor is disposed in a control system configured to control the HRSG system at least in part based on the rate of change of degradation of the specific component of the HRSG system, and wherein the graph comprises a first axis representative of a time between a current time and a future time and a second axis representative of the current level of risk and a predicted level of risk.

2. The system of claim 1, wherein the degradation contributor model comprises a parametric model having at least one coefficient configured to reflect a weight or an importance of a degradation of the specific component of the plant.

3. The system of claim 1, wherein the degradation contributor model comprises a conventional degradation contribution, a non-conventional degradation contribution, or a combination thereof.

4. The system of claim 3, wherein the processor is configured to receive a sensor reading comprising a temperature, a flow rate, a pressure, a fuel utilization, a speed, or a combination thereof based on a sensor disposed in the industrial plant, and to update the level of risk based on the sensor reading.

5. The system of claim 1, wherein the plant transfer function comprises at least one component level transfer function configured to model a relationship between an input and an output of the specific plant component.

6. The system of claim 5, wherein the specific plant component comprises a heat recovery steam generation (HRSG) system component.

7. The system of claim 1, wherein the plant level cost model comprises at least one objective function comprising a cost of producing power for the industrial plant.

8. The system of claim 1, wherein the control system comprises an optimal controller having a linear programming (LP) solver, a second order cone programming (SOCP) solver, a semi-definite programming (SDP) solver, a conic programming solver, a non-linear programming solver, a constraint satisfaction solver, a heuristic solver, or a combination thereof.

9. The system of claim 1, wherein the advisory system comprises a k-nearest neighbor (k-NN) system, an expert system, a neural network, a genetic algorithm (GA), a state vector machine, or a combination thereof.

10. The system of claim 1, wherein the control system is configured to automatically execute the operational advisory.

11. A method, comprising:
receiving, via a processor, a plurality of data from sensors disposed in a heat recovery steam generation (HRSG) system;
transforming, via the processor, the plurality of data into a degradation contributor model via a component level transfer function;
determining, via the processor, an operational advisory in an industrial plant, wherein the operational advisory is determined based upon a plant transfer function, a degradation contributor model, a plant level cost function, or a combination thereof and one or more optimization objectives, wherein the degradation contributor model is configured to derive a difference between a rated value of the HRSG system and a current value observed via the sensors, and to derive a rate of change of degradation of the specific component of the HRSG system, wherein the rated value comprises at least one of a temperature, a flow rate, a pressure, or a combination thereof;
outputting, via the processor, the operational advisory, wherein the operational advisory comprises at least one of a maintenance schedule, an alert, or a combination thereof;
deriving, via the processor, a level of risk for the occurrence of an undesired equipment event during operations of a specific component of the industrial plant based on the plant transfer function, the degradation contributor model, the plant level cost function, or the combination thereof;
displaying, via a graphical user interface comprising a visual display, the level of risk, and
controlling, via the processor, the HRSG system at least in part based on the rate of change of degradation of the specific component of the HRSG system, and wherein the visual display comprises a graph having a first axis representative of a time between a current time and a future time and a second axis representative of a current level of risk and a predicted level of risk.

12. The method of claim 11, wherein the degradation contributor model comprises a parametric model having at least one coefficient configured to reflect a weight or an importance of a degradation of the specific component of the plant.

13. The method of claim 11, wherein the plant transfer function comprises at least one component level transfer function configured to model a relationship between an input and an output of a plant component.

14. The method of claim 11, comprising:
determining, via the processor, the plant transfer function from at least one of a current plant data, a historical plant data, a component degradation data, a physical data, a technical and business data, or an environmental data;
determining, via the processor, at least one component level transfer function from at least one of the current plant data, the historical plant data, a component degradation data, the physical data, the technical and business data, or the environmental data;
building, via the processor, the degradation contributor model from the at least one component level transfer function, a conventional degradation contribution, a non-conventional degradation contribution, or a combination thereof; and
building, via the processor, the plant level cost function from the degradation contributor model and a plurality of critical parameters, wherein the plurality of critical parameters are derived from at least one of the current plant data, the historical plant data, the component degradation data, the physical data, the technical and business data, the environmental data, or an optimization goal, and wherein the optimization goal comprises a minimization of the plant level cost function.

15. The method of claim 11, comprising:
generating an automated control command, wherein the automated control command is configured to automatically implement the operational advisory.

16. A system comprising:
non-transitory, computer-readable medium comprising code configured to:
receive a plurality of data from sensors disposed in a heat recovery steam generation (HRSG) system;
transform the plurality of data into a degradation contributor model via a component level transfer function;
determine an operational advisory in an industrial plant, wherein the operational advisory is determined based upon a plant transfer function, the degradation contributor model, a plant level cost function, or a combination thereof and one or more optimization objectives, wherein the degradation contributor model is configured to derive a difference between a rated value of the HRSG system and a current value observed via the sensors, and to derive a rate of change of degradation of the specific component of the HRSG system;
output the operational advisory, wherein the operational advisory comprises at least one of a maintenance schedule, an alert, message control action, or a combination thereof;
derive a level of risk for the occurrence of an undesired equipment event during operations of a specific component of the industrial plant based on the plant transfer function, the degradation contributor model, the plant level cost function, or the combination thereof; display, via a graphical user interface comprising a visual display, the level of risk, and
control the HRSG system at least in part based on the rate of change of degradation of the specific component of the HRSG system, and wherein the visual display comprises a graph having a first axis representative of a time between a current time and a future time and a second axis representative of a current level of risk and a predicted level of risk.

17. The system of claim 16, wherein the degradation contributor model comprises a parametric model having at least one coefficient configured to reflect a weight or an importance of a degradation of the specific component of the plant.

18. The system of claim 16, wherein the plant transfer function comprises at least one component level transfer function configured to model a relationship between an input and an output of a plant component.

19. The system of claim 16, comprising the industrial plant, wherein the industrial plant comprises at least one of a power plant, a chemical plant, a refinery, a manufacturing plant, or a combination thereof, having the non-transitory, computer-readable medium.

* * * * *